Aug. 4, 1953 H. M. STEPHENS 2,647,737
CUTTER BIT AND HOLDER THEREFOR
Filed July 26, 1950 3 Sheets-Sheet 2
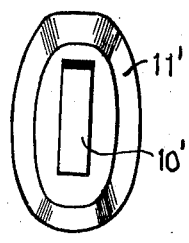
Fig. 8.
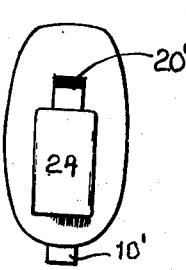
Fig. 9.
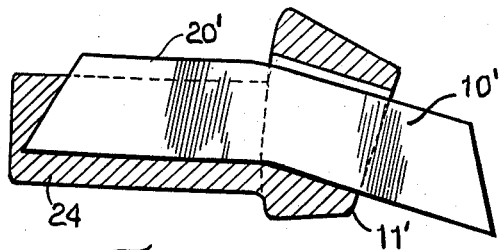
Fig. 10.
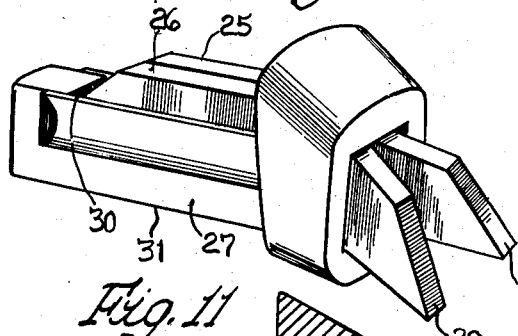
Fig. 11.
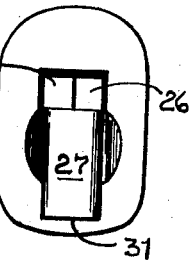
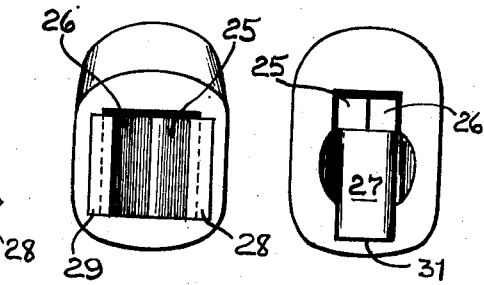
Fig. 12. Fig. 13.
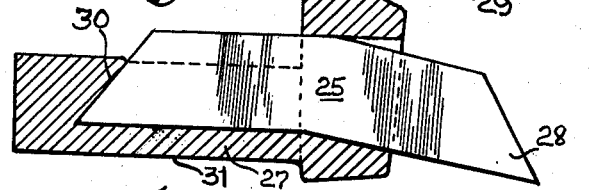
Fig. 14.
Fig. 15.
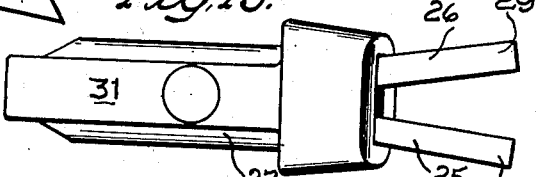
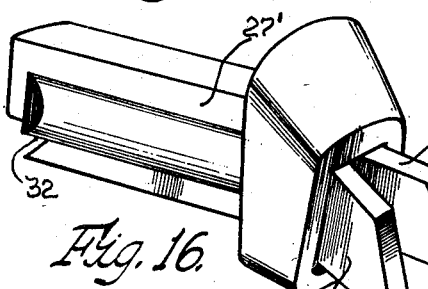
Fig. 16.
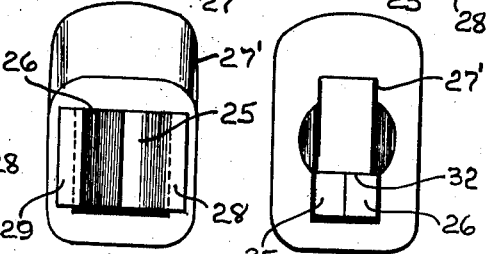
Fig. 17. Fig. 18.
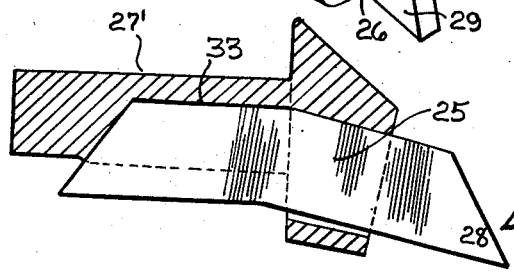
Fig. 19.
INVENTOR.
Henry M. Stephens
BY Clarence E. Threlkeld
His Attorney.

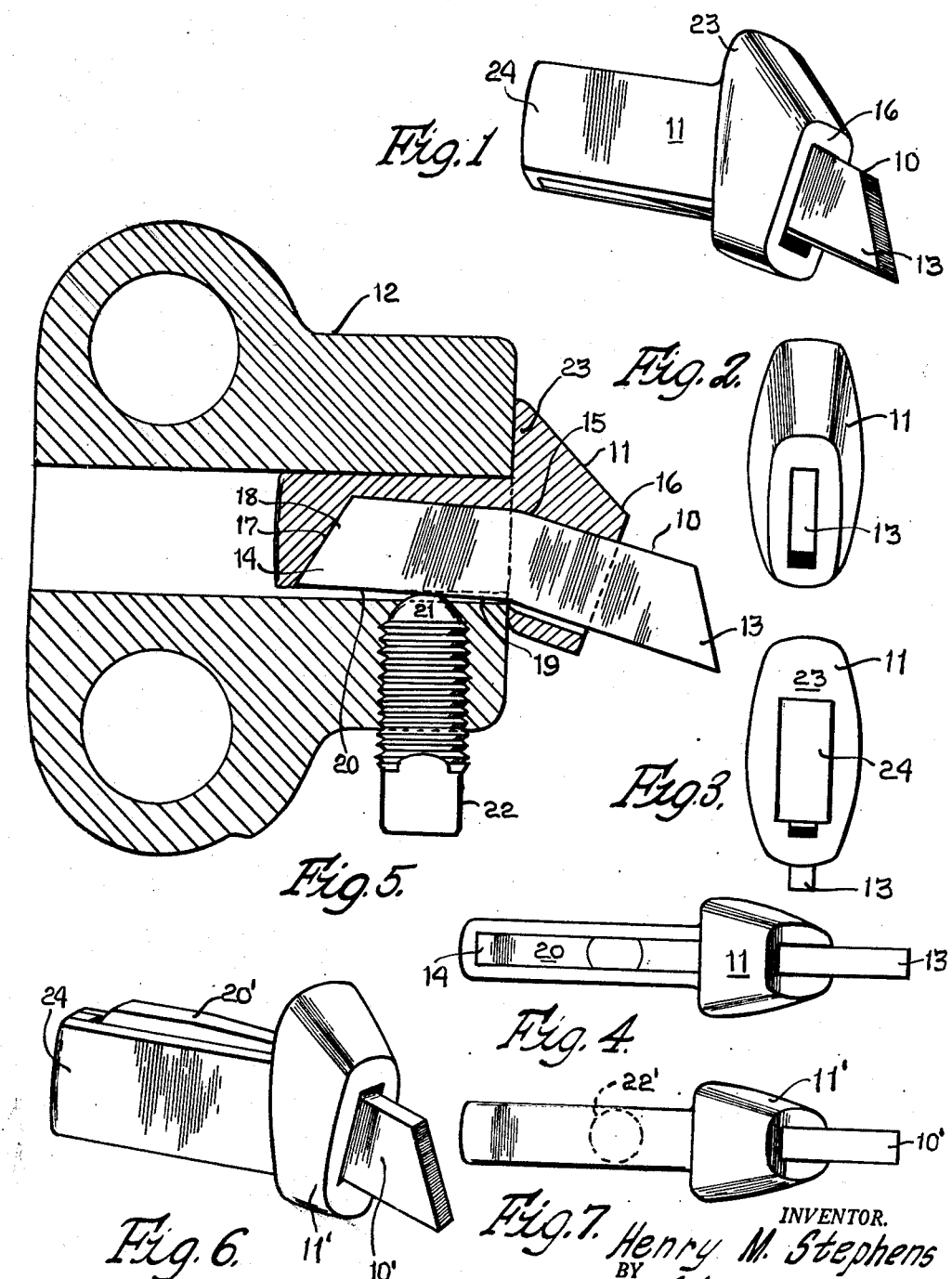

Patented Aug. 4, 1953

2,647,737

UNITED STATES PATENT OFFICE 2,647,737

CUTTER BIT AND HOLDER THEREFOR

Henry M. Stephens, Montgomery, W. Va., assignor to Marathon Coal Bit Company, Inc., Montgomery, W. Va., a corporation of West Virginia Application July 26, 1950, Serial No. 175,987

2 Claims. (Cl. 262—33)

One of the several objects of my invention is to provide a cutter bit and holder therefor related in a manner with respect to each other such that when the cutter bit and holder are mounted in the block of a cutter chain, the bit and holder will cooperate with each other and with respect to the clamping screw so as to constitute an effective connection between the cutter bit and holder therefor and the cutter chain block.

Another and equally important object of the invention is to provide in a cutter chain block a holder constructed and designed to hold therein a pair of cutter bits having their major length confined in the holder in flat confronting relation with respect to each other and their outer end portions diverging from each other to dispose the cutting ends thereof in spaced relation with respect to each other, whereby during the operation of the cutter chain in cutting coal, the twin bits will cut a kerf in the coal seam large enough for the cutter bar to pass through and advance along the kerf. Such an arrangement results in the reduction of wear and tear upon the cutter bar and greatly reduces abrasive wear on the bit holder, bit block and cutter chain, with the result that the twin cutter bits may be subjected to long and continued use.

In coal cutting operation, it is the practice to stagger the cutter bits held by the chain blocks, so that a kerf of substantial width may be produced for the cutter bar. By the provision of the twin bits, it is obvious that by practicing this staggering of the bits, a kerf with a much larger width will be produced, thereby accomplishing the above-stated object of reducing wear and tear upon the cutter bar to a minimum.

Such an arrangement also results in eliminating what is known in the coal mining trade as "coring" of the kerf during cutting operation. Such term means that under certain conditions of formation, the cutter bits will cut trenches only the width of the bit, making it necessary for the cutter bar to perform a coring operation. My improvement has for its object the elimination of such coring operation.

Another object of my invention is to provide a twin bit of the character hereinafter described, reversible in the bit holder.

Another and equally important object of this invention is to provide a bit and a bit holder which afford easy removal and insertion of the bit into the bit holder, without completely removing the bit holder from the chain block.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of one form of my improved bit and bit holder;

Fig. 2 is an outer end elevational view of the same;

Fig. 3 is an inner end elevational view of the same;

Fig. 4 is an edge view of the same;

Fig. 5 is an enlarged sectional detail view of the same;

Fig. 6 is a perspective view of my improved bit and holder similar to that shown in Fig. 1, but showing a slightly modified form of construction;

Fig. 7 is an edge view of the same;

Fig. 8 is an outer end elevational view of the bit shown in Fig. 6;

Fig. 9 is an inner end elevational view of the same;

Fig. 10 is a cross sectional detail view of the same;

Fig. 11 is a perspective view of a twin bit and holder construction embodying my invention;

Fig. 12 is an outer end view of the same;

Fig. 13 is an inner end view of the same;

Fig. 14 is a cross sectional detail view of the same;

Fig. 15 is an edge view of the same;

Fig. 16 is a perspective view similar to that shown in Fig. 11, but showing a slightly modified form of construction;

Fig. 17 is an outer end elevational view of the same;

Fig. 18 is an inner end elevational view of the same;

Fig. 19 is a cross sectional detail view of the same;

Figure 20:
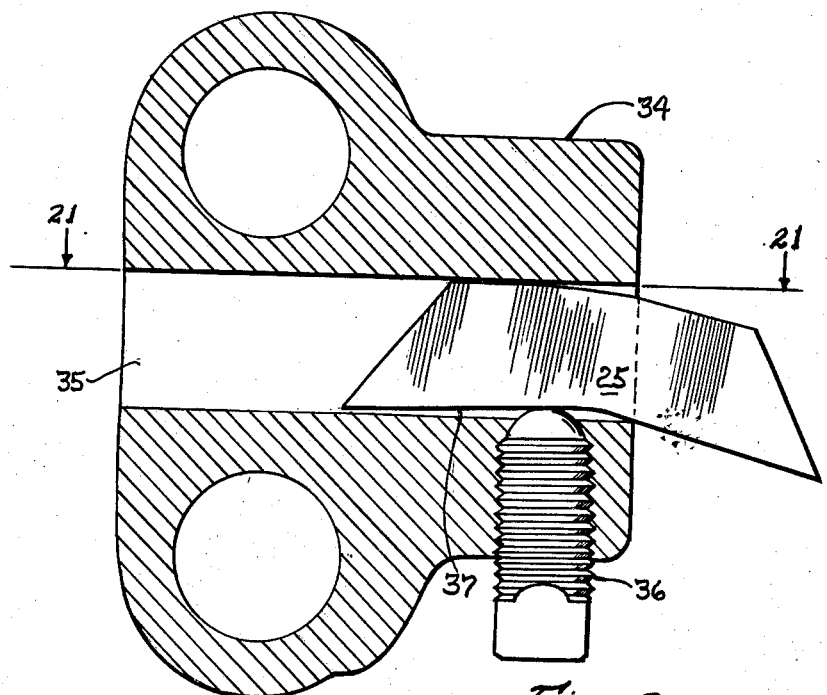
Fig. 20 is a sectional detail view of a chain block showing a bit without a holder, mounted therein.

Referring particularly to Figs. 1 to 5 inclusive illustrating one form of my invention, the bit is indicated at 10, the holder at 11, and a standard chain block at 12. The bit 10, in the present instance, provides opposite cutting tips 13 and 14, thereby constituting the bit a reversible bit.

This bit 10 is formed of flat stock comprising two sections of trapezium form and formed integral at what would constitute the abutment of adjacent unparallel sides of such trapeziums whereby to advance the active cutting tip with respect to inactive cutting tip when the bit is mounted in the holder 11. By "active cutting tip" is meant that tip which is in coal cutting position. By "inactive cutting tip" is meant that tip which is confined in the holder.

The holder 11 has a socket 15 formed therein to conform to the shape of the bit 10, whereby the bit 10 may be inserted into the holder 11 through the head 16 thereof. The base 17 of the socket 15, when engaging the side 18 of the bit 10, has a tendency to bear the tip 13 in the direction of its advancement with respect to the seam of coal when in coal cutting position. This results in positioning a portion 19 of the bit 10 from the open side of the socket 15, to dispose the edge portion 20 of the bit for engagement with the head 21 of the clamping screw 22 of the block 12. The head 16 of the holder 11 is provided with a bearing portion 23 which bears against the adjacent portion of the block 12 to firmly hold the bit 10 against chatter or the like.

By this arrangement the bit 10 may be inserted into the socket 15 and withdrawn therefrom through the head 16, without removing the holder 11 from the chain block 12. When the active cutting tip 13 has become dull, worn or broken, the bit 10 may thus be removed and reversed to dispose the cutting tip 14 into active cutting position.

In the form shown in Figs. 6 to 10 inclusive, the open side of the socket 15 is in the opposite side edge of the shank 24 of the holder 11.

The bit 10' is identical to the bit 10 shown in Figs. 1 to 5 inclusive. In this form of construction, the clamping screw 22' is intended to bear against the edge of the shank 24 opposite the open slot. By this arrangement, when the screw 22' is threaded in the chain block 12, the edge 20' of the bit 10' will bear against the adjacent wall of the chain block 12 and be forced into the socket and at the same time force the shank 24 against the adjacent wall of the chain block 12 opposite the clamping screw 22'.

Referring to Figs. 11 to 15, inclusive, I have shown a form of construction which comprises two bits 25 and 26 which, when arranged in the holder 27, present opposite diverging cutting tips 28 and 29 arranged in parallel spaced relation with respect to each other on opposite sides of the long central axis of the holder 27. These bits 25 and 26 in plan view are substantially the same as the bits 10 and 10', with the exception that each bit is bent upon a transverse line equidistant from its opposite cutting tips, so as to dispose the bit bodies on opposite sides of such line out of alignment with respect to each other. By this arrangement, when corresponding ends of the bits are arranged in the holder as shown in Fig. 11, adjacent portions of the bits will be in flat contacting relation with respect to each while the other portions of the bit will diverge from each other, thereby to space the active cutting tips 28 and 29 from each other and on opposite sides of the long axis of the holder 27.

By this arrangement, when the bits are in cutting operation, a substantially wide kerf is cut into the coal seam, and as the bits in the chain block are staggered, it will be seen that this wide kerf cut into the coal seam by the staggered pair of bits is readily accessible to by the cutting bar, with the result that the cutting bar will perform its operation with the maximum degree of efficiency, eliminating coring and producing the minimum degree of coal dust.

In the forms shown in Figs. 11 to 15 inclusive, the socket 30 into which the twin cutting bits 25 and 26 are arranged, opens in a direction opposite to the advancement of the active cutting tips 28 and 29. Such socket at its base is undercut in the manner shown in the drawings. The adjacent end of the cutter bit conforms to such undercut. Such undercut arrests lateral displacement of the cutter bit from the holder during handling of the assembled cutter bit holder prior to or upon removal of the same from the chain block. The arrangement is similar to that shown in Fig. 6, wherein, when the holder 27 is arranged in the chain block 12, the clamp screw 22 will bear against the edge 31 of the shank 27 opposite such open side of the socket and bear the exposed bit portions against the adjacent wall of the socket of the chain block 12.

In Figs. 16 to 19 inclusive, the form of construction is substantially similar to that shown in Figs. 11 to 15 inclusive, with the exception that the open side 32 of the socket 33 into which the bits 25 and 26 are arranged is in the advancing edge of the bit holder 27', so that when the bits and bit holder are arranged in the chain block 12, the clamping screw 22 will engage the bits 25 and 26, force the same into the socket 33, and in turn clamp the holder 27' into the socket of the chain block 12.

The form of bits shown in Figs. 11 to 19 inclusive, like that shown in Figs. 1 to 10 inclusive, are reversible bits, permitting the bits, when the active tips become dull or broken, to be reversed.

Figure 21:
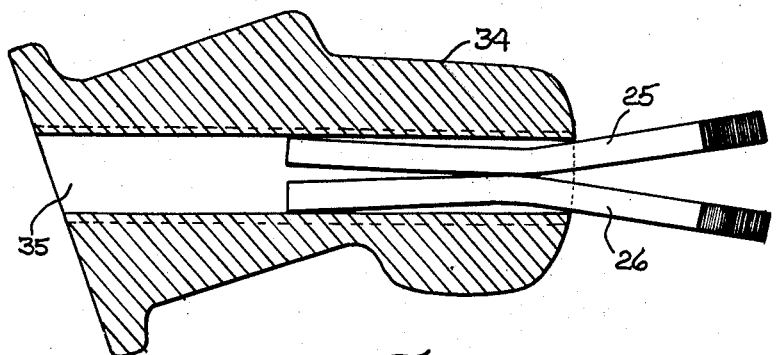
Fig. 21 is a sectional detail view taken substantially on line 21—21 of Fig. 20.

In some instances, the chain block does not provide a socket for a bit holder. In Figs. 20 to 21, I have shown how the twin bits illustrated in Figs. 11 to 19 inclusive are mounted in such a chain block. In this connection, the block is indicated at 34 and is provided with a socket 35. The bits 25 and 26 are arranged in the socket 35 in the manner shown in Figs. 20 and 21, with the clamping screw 36 bearing against the adjacent edges 37 of the bits. As before stated, these bits 25 and 26 are bent on two angles at a point equidistant from their cutting ends, and it is the point of bending that limits inward movement of the bits in the socket 35 of the bit block. At the same time, when the bits are placed in the bit block until the centers of the bits are flush with the face of the bit block, the distance from the face of the bit block to the positioned cutting ends of the bits is automatically and positively controlled, resulting in a correct "bit gauge," the latter term meaning the measurement from the face of the bit block to the cutting ends of the bits when the bits are secured in cutting position. In coal cutting operation, it is very important for the bit gauge to be correct and uniform throughout the cutter chain, and this is obtained through the use of my improved construction.

From the description herein, it will become apparent that I have provided a bit which is capable of long usage, and which, when the cutting tips become dull, roughened, or broken, may be sharpened or the bits may be reversed. By the use of multiple cutting points, which results from the employment of twin bits arranged in staggered relation with respect to each other on the chain block, there results a substantially wide kerf readily receptive to the cutting bar, with the result that the usual hard usage to which such bar is subjected is reduced to a minimum. It eliminates the cutting by such cutting bar of what is called, in the mining industry, a "core." It reduces the amount of coal dust produced, thus reducing to a minimum the danger resulting to a miner by reason of excessive coal dust. My cutting bits may also be manufactured at an economical cost.

While I have illustrated and described the preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A coal cutting implement for insertion in the block of a cutter chain, comprising a reversible cutter bit having opposite cutting tips, the bit being formed of substantially flat stock and having the form in plan view of a pair of trapeziums arranged with adjacent unparallel sides thereof in integral connection with respect to each other, the active cutting tip being thereby advanced with respect to the inactive cutting tip when the bit is mounted for operation, and a holder for said cutter bit having a head which has a transverse bearing surface which is adapted to bear against the side of the block and a longitudinal shank integrally extending from the head and insertable within the block, said holder having a longitudinal socket provided therein opening longitudinally through the head, the opening being sufficiently large so that the bit is insertable through it into the socket in a longitudinal direction with respect to the head, the socket being open at only one long edge of said shank, to permit application of retaining force bearing against the bit, the base of said socket being undercut and the inserted end portion of said bit conforming to said undercut and prevented thereby from lateral displacement with respect to the holder, a portion of a long edge of said bit projecting from the said edge of said shank.

2. A coal cutting implement comprising a cutter bit formed of substantially flat stock and having the form in plan view of a pair of trapeziums arranged with adjacent unparallel edges thereof in integral connection with respect to each other, and a holder for said cutter bit having a head and a shank integrally extending from the head, said holder having a socket provided therein opening longitudinally through the head and extending longitudinally of the shank and opening at only one long edge of said shank, said bit being insertable into the socket in a longitudinal direction with respect to the head, the base of said socket being undercut and the inserted end portion of said bit conforming to said undercut and prevented thereby from lateral displacement with respect to said holder, a portion of a long edge of said bit projecting from said socket beyond the said edge of said shank.

HENRY M. STEPHENS.

References Cited in the file of this patent

UNITED STATES PATENTS

| Number | Name | Date |
|---|---|---|
| 1,468,866 | Morgan | Sept. 25, 1923 |
| 2,183,581 | Osgood | Dec. 19, 1939 |
| 2,229,777 | Stephens | Jan. 28, 1941 |
| 2,262,592 | Stephens | Nov. 11, 1941 |
| 2,289,464 | Simmons | July 14, 1942 |

FOREIGN PATENTS

| Number | Country | Date |
|---|---|---|
| 22,042 | Great Britain | Oct. 10, 1902 |